(12) United States Patent
McCord

(10) Patent No.: US 10,951,411 B2
(45) Date of Patent: Mar. 16, 2021

(54) METHODS AND APPARATUS FOR A PASSWORD-PROTECTED INTEGRATED CIRCUIT

(71) Applicant: SEMICONDUCTOR COMPONENTS INDUSTRIES, LLC, Phoenix, AZ (US)

(72) Inventor: Charles Frederic McCord, Corvallis, OR (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 374 days.

(21) Appl. No.: 15/684,356

(22) Filed: Aug. 23, 2017

(65) Prior Publication Data
US 2019/0068375 A1 Feb. 28, 2019

(51) Int. Cl.
| H04L 29/06 | (2006.01) |
| H04L 9/32 | (2006.01) |
| B60R 25/24 | (2013.01) |
| G06F 21/72 | (2013.01) |
| H04L 9/08 | (2006.01) |
| G06F 21/44 | (2013.01) |

(52) U.S. Cl.
CPC ............ *H04L 9/3226* (2013.01); *B60R 25/24* (2013.01); *G06F 21/44* (2013.01); *G06F 21/72* (2013.01); *H04L 9/0863* (2013.01); *H04L 9/0872* (2013.01); *B60R 2325/108* (2013.01); *H04L 2209/12* (2013.01); *H04L 2209/84* (2013.01)

(58) Field of Classification Search
CPC ...... H04L 9/3226; H04L 9/0863; G06F 21/72
USPC .......................................................... 713/189
See application file for complete search history.

(56) References Cited

U.S. PATENT DOCUMENTS

| 6,005,936 | A | 12/1999 | Shimizu | |
| 6,401,207 | B1* | 6/2002 | Funakoshi | B60R 25/00 380/262 |
| 6,973,570 | B1 | 12/2005 | Hamlin | |
| 8,649,518 | B1 | 2/2014 | Langhammer | |
| 2004/0164848 | A1 | 8/2004 | Hwang | |
| 2010/0281056 | A1* | 11/2010 | Nonaka | G06F 21/10 707/770 |
| 2012/0297190 | A1 | 11/2012 | Shen | |
| 2013/0198524 | A1* | 8/2013 | Balinsky | G06F 21/6209 713/189 |
| 2014/0049653 | A1 | 2/2014 | Leonard | |
| 2014/0189365 | A1 | 7/2014 | Cox | |

(Continued)

OTHER PUBLICATIONS

Razzaq, "Security Issues in the Internet of Things (IoT): A Comprehensive Study", 2017, IJACSA, pp. 383-388 (Year: 2017).*

*Primary Examiner* — Taghi T Arani
*Assistant Examiner* — Gregory A Lane
(74) *Attorney, Agent, or Firm* — The Noblitt Group, PLLC; Hettie L. Haines

(57) ABSTRACT

Various embodiments of the present technology may comprise methods and apparatus for a password-protected integrated circuit. According to various aspects of the present invention, the password-protected integrated circuit may comprise a cryptosystem that is encoded with a password seed and used to authenticate control data prior to being transmitted to a sensor and/or a sensor control circuit, wherein the sensor and/or sensor control circuit responds to authenticated control data.

20 Claims, 3 Drawing Sheets

(56) References Cited

U.S. PATENT DOCUMENTS

| | | | |
|---|---|---|---|
| 2015/0003607 A1* | 1/2015 | Choi | H04W 12/003 |
| | | | 380/44 |
| 2015/0113633 A1 | 4/2015 | Yeom | |
| 2016/0056964 A1* | 2/2016 | Andiappan | G06F 21/602 |
| | | | 713/189 |
| 2016/0337548 A1* | 11/2016 | Osborn | G06F 16/5866 |
| 2017/0109521 A1* | 4/2017 | Ujiie | G06F 21/44 |

\* cited by examiner

METHODS AND APPARATUS FOR A PASSWORD-PROTECTED INTEGRATED CIRCUIT

BACKGROUND OF THE TECHNOLOGY

Image sensors are becoming key components of industrial, commercial, security, and automotive systems. Image sensors are increasingly being used in applications where secure operation is very important to safe operation, such as in advanced driver assist systems (ADAS) and/or autonomous driving systems. As the role of the image sensors increases, it is important to protect them from malicious activities (i.e., "hacking") intended to alter the functionality of the system. For example, altered image data could be used to misdirect driver assist or autonomous driving systems, which could result in serious injury and damage.

SUMMARY OF THE INVENTION

Various embodiments of the present technology may comprise methods and apparatus for a password-protected integrated circuit. According to various aspects of the present invention, the password-protected integrated circuit may comprise a cryptosystem encoded with a password seed and configured to authenticate control data prior to transmission to a sensor and/or a sensor control circuit, wherein the sensor and/or sensor control circuit responds to authenticated control data.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various controllers, processors, password generators, sensors, and the like, which may carry out a variety of functions. In addition, the present technology may be integrated in any number of electronic systems, such as automotive, aviation, security, and surveillance systems, and the systems described are merely exemplary applications for the technology. Further, the present technology may be practiced in conjunction with any sensor, such as an image sensor, motion sensor, audio sensor, and the like.

Figure 1:
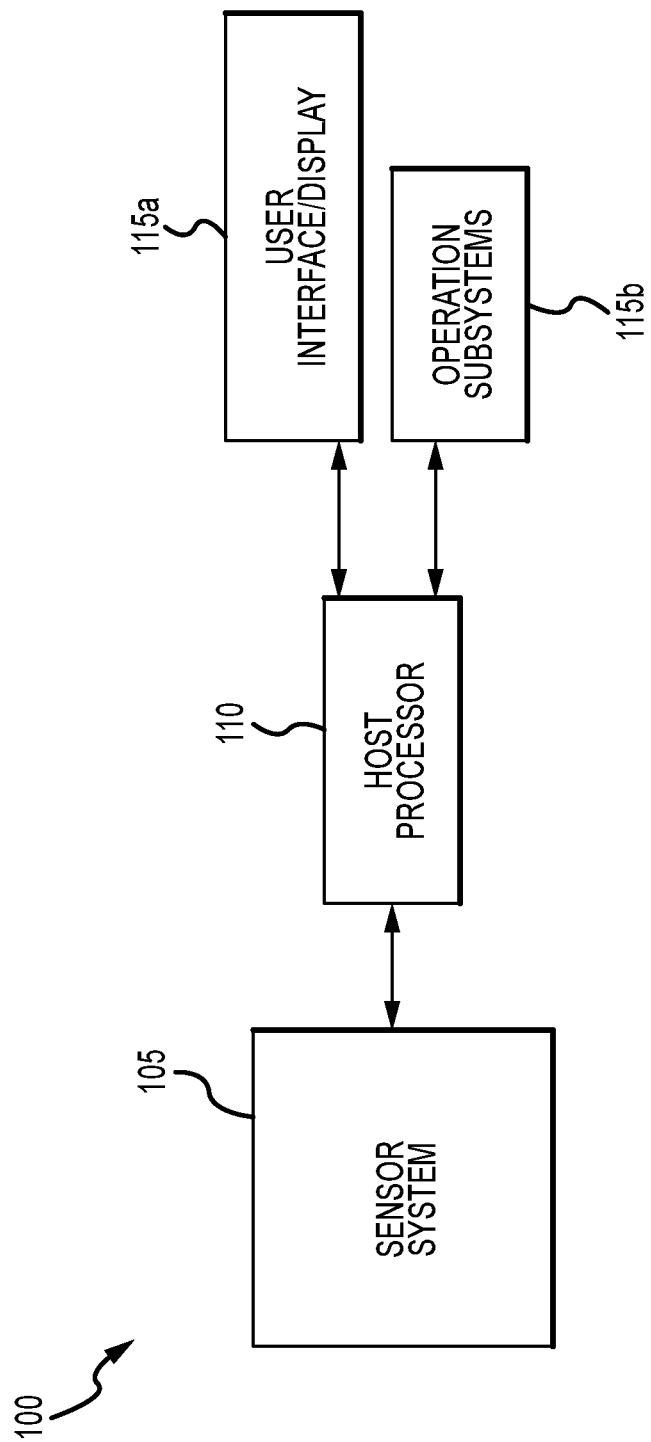
FIG. 1 is a block diagram of a system in accordance with an exemplary embodiment of the present technology.

Methods and apparatus for a password-protected integrated circuit according to various aspects of the present technology may operate in conjunction with any suitable electronic system, such as an automotive system (e.g., advanced driver assist system). Referring to FIG. 1, an exemplary automotive system 100 may comprise an automotive-based imaging system, such an advanced driver assist system or an autonomous driver system. The system 100 may be configured to capture image data and display the image data to a user, such as a driver of the automobile. The system 100 may be further configured to receive the image data and operate according to the image data. For example, according to various embodiments, the system 100 comprises a sensor system 105 and a host processor 110.

The host processor 110 may receive and respond to information and/or signals from the sensor system 105, such as digital image data, message data. For example, the host processor 110 may be communicatively coupled to the sensor system 105 and configured to transmit data to and receive data from the sensor system 105. For example, the host processor 110 may transmit control data (control information) to the sensor system 105 and may receive status data (status information) and secured sensor data from the sensor system 105.

The host processor 110 may further receive and respond to information and/or signals from a peripheral system 115a, 115b. Similarly, the host processor 110 may be further communicatively coupled to the peripheral system 115a, 115b and configured to transmit data to and receive data from the peripheral system 115a, 115b. The host processor 140 may comprise any suitable system for interacting with the sensor system 105 and/or peripheral system 115a, 115b. For example, the host processor 110 may comprise a host computer with a central processing unit (CPU) and dedicated memory device, such as a random access memory (RAM). Alternatively, the host processor 110 may comprise a dedicated controller, a logic array, an ASIC, and/or other suitable hardware and/or software configured to interact with the peripheral system 115a, 115b and/or the sensor system 105 according to their respective signals.

The peripheral system 115a, 115b may comprise any appropriate system that performs functions in the relevant environment according to signals from the host processor 110. In an exemplary embodiment, the system 100 comprises multiple peripheral systems 115a, 115b, each performing a different function, such as vehicle control systems and driver interface systems. For example, in an automotive application (automobile), the system 100 may comprise a user interface 115a positioned in an interior of the automobile, and an operation sub-system 115b, such as a directional movement controller, braking system, steering system, acceleration system, and the like.

The user interface 115a may be configured to display images and/or video to the driver of the automobile. The user interface 115a may be located within the cab of automobile near the driver for ease of viewing. The user interface 115a may comprise a display screen positioned in the display panel, center console, or dashboard to display information to the driver such as: an infotainment system and/or a navigation system, a back-up assistance system, surround view system, and the like. The user interface 115a may operate in conjunction with various components, such as the host processor 110 and/or the sensor system to display various messages and data, such as image data. The user interface 115a may be configured to allow the driver to selectively activate various systems and/or operating modes. For example, the user interface 115a may comprise any suitable forms of user input such as a touchscreen, keypad, buttons, and the like, which allow the driver to interact with a graphical user interface. The user interface 115a may further indicate a state of the system's 100 environment. For example, in a vehicle system, the user interface 115a may indicate whether the vehicle is in a forward or a reverse operating mode.

The operation subsystems 115b may operate in conjunction with various systems and/or devices to coordinate various functions and/or automate control of the system 100. For example, in a vehicle system, the operation subsystems 115 may operate in conjunction with the host processor 110 and the sensor system 105 to coordinate vehicle functions and/or automate vehicle control and operation to increase car safety and road safety. Safety features may be designed to avoid collisions by implementing safeguards and taking over or supplementing control of the vehicle. The operation subsystems 115b may comprise any appropriate system that performs functions in the relevant environment according to signals from the host processor 110.

In various embodiments, the system 100 may comprise multiple operation subsystems 115b, each performing different functions. For example, the operation subsystems 115b may comprise a braking system, steering system, acceleration system, and the like. Each of the operation subsystems 115b may receive specific instructions from the host processor 110 based on data from the sensor system 105. For example, in the case of a vehicle system, the host processor 110 may respond to image data from the sensor system 105 by transmitting an instruction to the braking system to stop/decelerate the vehicle.

The sensor system 105 captures and processes relevant data. In various embodiments, the sensor system 105 may be configured as an integrated circuit comprising various devices and/or systems to detect/capture information, perform control functions, and transmit relevant data to the host processor 110. The sensor system 105 may be further configured to generate a password, store a password, authenticate a password, encode a password into relevant data, provide status data indicating the status of the authentication/validation, and/or receive the control data. For example, and referring to FIG. 2, the sensor system 105 may comprise a sensor 215, a sensor control circuit 210, and a cryptosystem 225.

According to an exemplary embodiment, the sensor system 105 is coupled to the host processor 110 and may be configured to receive and/or transmit data from/to the host processor 110. For example, the sensor system 105 may receive the control data from the host processor 110 and may transmit the status data and secured sensor data to the host processor 110.

According to various embodiments, the sensor 215 may detect and/or capture relevant data. For example, the sensor 215 may comprise an image sensor to capture image data by generating and collecting charge. Light may enter and strike a photosensitive surface of the image sensor, which generates charge. The image sensor may further process and convert the charge to digital image data using any suitable method or technique. The image sensor may be implemented in conjunction with any appropriate technology, such as active pixel sensors in complementary metal-oxide-semiconductors (CMOS) and charge-coupled devices (CCD). For example, the image sensor may comprise a pixel array (not shown) to generate charge and a lens (not shown) to focus the light on the photosensitive surface. The image sensor may further comprise various circuits and/or systems to perform signal conversion, sampling, and various digital signal processing functions on the image data, such as color interpolation, color correction, auto-focus, exposure adjustment, noise reduction, white balance adjustment, compression, and the like.

In various embodiments, the image sensor may further comprise a color filter system (not shown), such as a color filter array (CFA), to filter impinging light according to wavelength. The CFA may comprise a pattern of color filters situated on the pixel array to capture color information. In various embodiments, each pixel in the pixel array is covered with one color of the CFA. For example, a Bayer color filter array comprising a pattern of red, blue, and green filters may be provided, wherein each pixel is covered with one of a red, blue, or green filter. In other embodiments, the CFA may be formed using other color filters, such as a RCCG filter (one red, two clear, and one green), a RCCC filter (one red, and three clear), a CRGB filter (one cyan, one red, one green, and one blue), and any other suitable color pattern. In various embodiments, the CFA may comprise "clear" or transparent filter elements. The CFA may form a 2×2 color pattern, a 4×4 color pattern, a 2×4 color pattern, or any other suitable pattern size. In various embodiments, the CFA may repeat to cover the entire pixel array.

The cryptosystem 225 may be configured to implement various security and authentication schemes, such as implementing encryption/decryption algorithms, authenticating data, and tagging data with a unique identifier. For example, the cryptosystem 225 may comprise any suitable devices and/or systems capable of storing a password seed, generating a key from the password seed, authenticating the control data from the host processor 110, providing authenticated control data to the sensor control circuit 210, and tagging sensor data with a unique identifier. In one embodiment, the cryptosystem 225 may comprise a programmable logic device, such as a field programmable gate array (FPGA), or any other device with reconfigurable digital circuits. In other embodiments, the cryptosystem 225 may be implemented in hardware using non-programmable devices, such as an application-specific integrated circuit (ASIC). In another embodiment, the cryptosystem 225 may be implemented with both programmable and non-programmable devices. According to various embodiments, the cryptosystem 225 may further comprise a memory device and/or system. In an exemplary embodiment, the cryptosystem 225 comprises a password circuit 200, an authentication circuit 205, and a data tagging circuit 220.

The password circuit 200 may be configured to store a password seed, generate a key based on the password seed, and store the generated key. The password circuit 200 may be encoded with the password seed at the time the sensor system 105 is manufactured and/or encoded by the host processor 110. In various embodiments, the password seed may be encoded in the password circuit 200 once at the time of manufacture and may be encoded again with a new password seed by the host processor 110 at a later time. For example, according to an exemplary embodiment, the password circuit 200 may comprise a memory, such as a register or any other suitable storage device, to store the password seed and/or the generated key.

The password circuit 200 may utilize any suitable method or technique for generating a key from the password seed. For example, the password circuit 200 may generate the key utilizing an encryption algorithm and/or a key generator algorithm based on known data, such as the control data, recent status data, recent sensor data, or any other suitable data. The length of the key may be any suitable number of bits and may be selected according to the particular application and/or desired level of security.

According to an exemplary embodiment, the password circuit 200 may be coupled to the authentication circuit 205 and may be configured to receive and/or transmit data from/to the authentication circuit 205, such as the key, a security code, and/or other relevant data.

The authentication circuit 205 may be configured to authenticate control data utilizing the key from the password circuit 200. In an exemplary embodiment, the authentication circuit 205 may be coupled to the host processor 110 and configured to receive and authenticate the control data from the host processor 110. For example, the authentication circuit 205 may configured to read a security code transmitted with the control data and decrypt the security code with the key. The authentication circuit 205 may be further coupled to the sensor control circuit 210 and configured to transmit authenticated control data to the sensor control circuit 210. The authentication circuit 205 may comprise any device and/or system suitable for decrypting a code with a key. For example, the authentication circuit 205 may comprise a programmable logic device, such as a field programmable gate array (FPGA), or any other device with reconfigurable digital circuits. In other embodiments, the authentication circuit 205 may be implemented in hardware using non-programmable devices, such as an application-specific integrated circuit (ASIC). In another embodiment, the authentication circuit 205 may be implemented with both programmable and non-programmable devices.

According to various embodiments, the sensor system 105 may further comprise a data tagging circuit 220. The data tagging circuit 220 may be configured to tag and/or encrypt the sensor data with a unique identifier, such as authentication status, authentication data, a password, and the like, to authenticate the sensor data. For example, when the sensor 215 is an image sensor, the data tagging circuit 220 may tag the image data with authentication data and/or the password from the password circuit 200, encrypt the image metadata, apply a watermark to the image data, and/or provide any other suitable identifier. In various embodiments, the password from the password circuit 200 may be tagged at the end of each image frame or other predetermined interval or period of time. The frequency of tagging the sensor data with the unique identifier may be based on the particular application. The data tagging circuit 220 may utilize any suitable method or technique to tag the sensor data with the unique identifier.

According to an exemplary embodiment, the data tagging circuit 220 may be coupled to the sensor 215 and configured to receive sensor data transmitted from the sensor 215. The data tagging circuit 220 may be further coupled to the host processor 110 and configured to transmit the tagged sensor data (secured sensor data output) to the host processor 110. The host processor 110 may be configured to identify the tag to determine the integrity and authenticity of the sensor data.

The sensor control circuit 210 may be configured to receive and respond to the control data from the cryptosystem 225. In an exemplary embodiment, the sensor control circuit 210 may be coupled to the authentication circuit 205, and may receive the control data from the authentication circuit 205. When the sensor control circuit 210 receives the control data from the cryptosystem 225, the sensor control circuit 210 treats the incoming control data as authentic (i.e., that the source (e.g., the host processor 110) of the control data has not been compromised). Accordingly, the control data that the sensor control circuit 210 receives from the cryptosystem 225 is referred to as authenticated control data.

The sensor control circuit 210 may utilize the authenticated control data to select, activate, and/or control various aspects of the sensor 215. For example, in the case where the sensor 215 is an image sensor, the sensor control circuit 210 may comprise various devices and/or systems to control an exposure time (i.e., integration) of the pixel array, control readout operations of the pixel signals, provide reset signals to the pixel array, control and/or select a gain setting to manage the dynamic range of the sensor, and the like. The particular control operations of the sensor control circuit 210 may be based on the particular type of sensor 215.

In various embodiments, the sensor control circuit 210 may be coupled to the sensor 215 and may transmit sensor operation signals according to the authenticated control data. The particular operation signals produced by the sensor control circuit 210 may be based on the type of sensor 215 incorporated into the sensor system 105. For example, if the sensor 215 comprises an image sensor, the sensor control circuit 210 may transmit operation signals related to readout of all or a portion of the pixel signals from the pixel array. The sensor control circuit 210 may further transmit operation signals related to the exposure period and/or an image capture mode (e.g., global reset release mode, global shutter mode, and electronic rolling shutter mode).

In various embodiments, the sensor control circuit 210 may comprise sequencing and/or logic circuits, such as row circuitry and column circuitry that operate in conjunction with each other to read out the pixels in a progressive scan manner (i.e., from top to bottom and left to right). The sensor control circuit 210 may further utilize a clock signal (not shown) to adjust the timing of the exposure period and/or the pixel signal readout.

The sensor control circuit 210 may be further configured to generate and transmit sensor status data to the cryptosystem 225. For example, the sensor control circuit 210 may generate and transmit sensor status data to the authentication circuit 205. The authentication circuit 205 may then authenticate the sensor status data in the same manner that the control data is authenticated and forward the secured sensor status data to the host processor 110. The sensor status data may indicate the operation status of the sensor 215, such as system command acknowledgements (e.g., whether or not the authentication circuit 205 received the control data), sensor configuration register values, sensor statistics (e.g., pixel contrast, pixel luminance, etc.), and self-test status (whether or not an error flag has been detected), and the like.

According to various embodiments, the sensor system 105 operates in conjunction with the host processor 110 to validate various data transmitted between them. For example, in an exemplary embodiment, the sensor system 105 validates (i.e., authenticates) data from the host processor 110 and provides status data to the host processor 110. According to various embodiments, the sensor system 105 may further tag sensor data with a unique identifier that the host processor 110 can recognize and/or decrypt to verify the authenticity of the sensor data.

Figure 2:
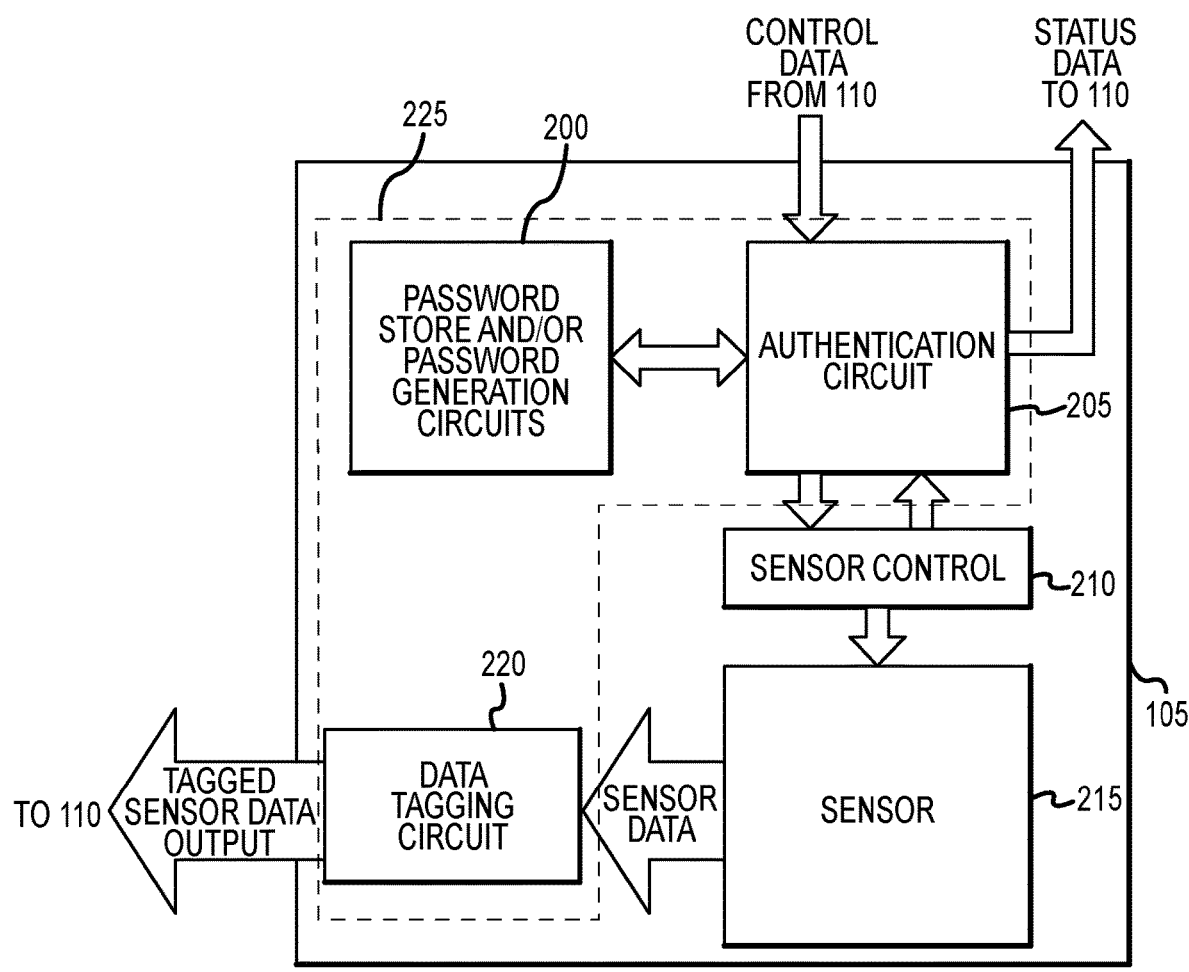
FIG. 2 is a block diagram of a password-protected integrated circuit in accordance with an exemplary embodiment of the present technology.
Figure 3:
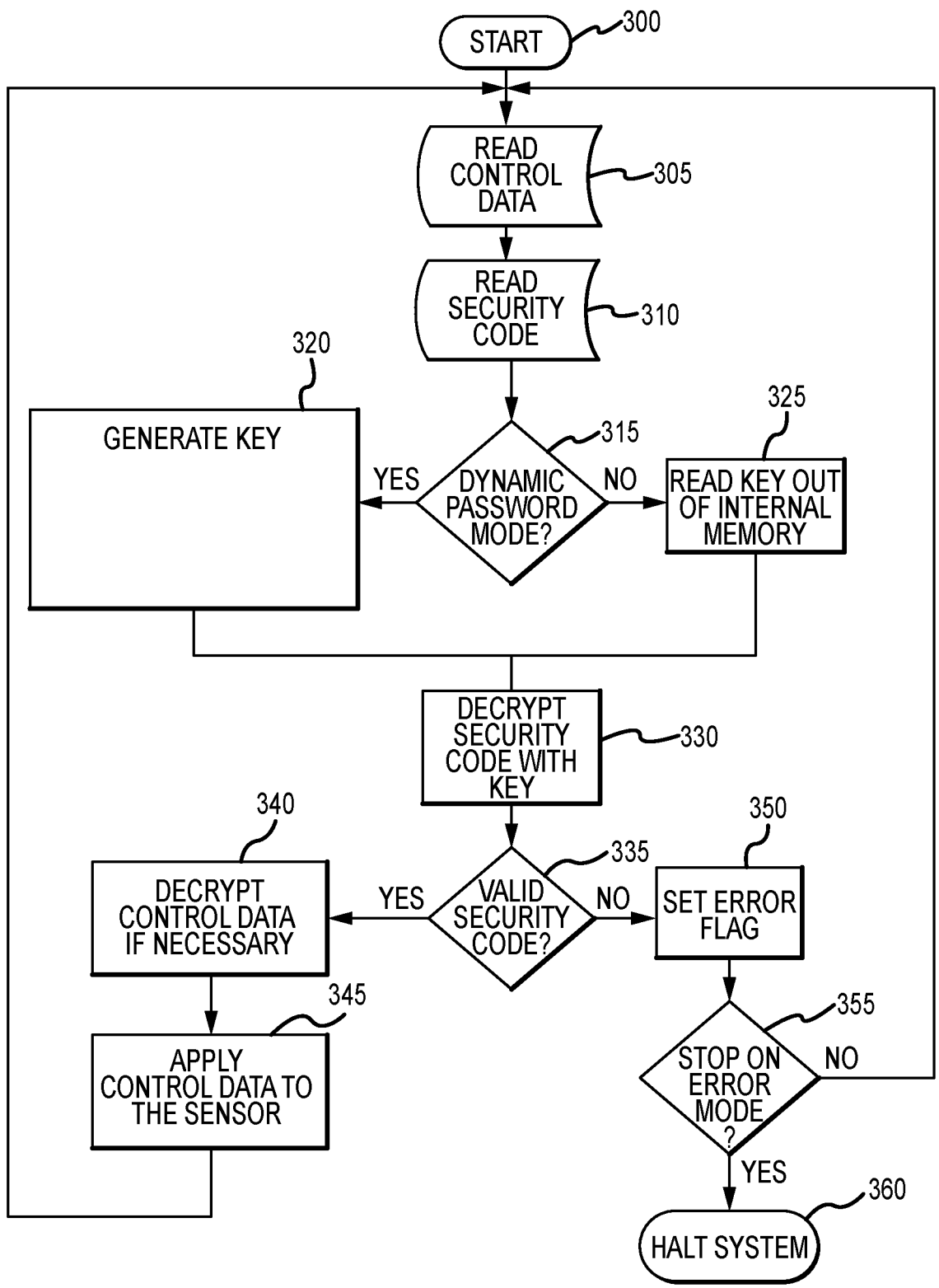
FIG. 3 is a flowchart for operating a password-protected integrated circuit in accordance with an exemplary embodiment of the present technology.

Referring to FIGS. 2 and 3, in an exemplary operation, the host processor 110 may transmit control data to the sensor system 105 (300). The cryptosystem 225, for example the authentication circuit 205, may receive and read the control data (305). According to various embodiments, the control data may be encrypted. The host processor 110 may further transmit a security code to the cryptosystem 225 proximate in time to the control data. The cryptosystem 225, for example the authentication circuit 205, may also read the security code (310).

The cryptosystem 225 may be configured to operate in a dynamic password mode or in a regular password mode. If the cryptosystem 225 is in the dynamic password mode, the password circuit 200 will generate a key each time the cryptosystem 225 reads new control data (320). When the cryptosystem 225 is in the regular mode, the authentication circuit 205 may read the key stored in an internal memory (325). During the regular mode, the password circuit 200 may generate a new key based on a predetermined time interval or when provided a specific command from the host processor 110. The cryptosystem 225, for example the password circuit 200 and/or the authentication circuit 205, then decrypts the security code with the key (330) and determines if the security code is valid (335).

If the security code is valid, the authentication circuit 205 may then transmit the authenticated control data to the sensor control circuit 210. If the control data is encrypted, the password circuit 200 and/or the authentication circuit 205 may decrypt the control data (340). The sensor control circuit 210 utilizes the authenticated control data to transmit the operation signals, such as a reset signal, a row select signal, a gain signal, and the like, to the sensor 215.

If the security code is not valid, then the cryptosystem 225, for example the authentication circuit 205, may set an error flag (350). The cryptosystem 225 may further transmit the status of the validation (status data/information) to the host processor 110, wherein the host processor 110 may halt signals and/or operation of the peripheral systems 115a, 115b (360). The cryptosystem 225 and/or host processor 110 may further halt any subsequent control data from being transmitted to the authentication circuit 205.

In various embodiments, the cryptosystem 225 may be equipped with a self-test function that may be activated/deactivated (e.g., stop on error mode?) (355). If the self-test function is activated, the sensor system 105 will halt further operation if an error flag is set. If the self-test function is deactivated, the sensor system 105 will to continue to operate while the host processor 110 assesses the error.

According to various embodiments, after the sensor 215 receives the operation signals and generates sensor data, the cryptosystem 225, for example the data tagging circuit 220, may receive and tag the sensor data with the unique identifier. The sensor system 105 may then transmit the tagged sensor data to the host processor 110. The host processor 110 may be configured to recognize and/or decrypt the unique identifier to verify the authenticity and/or validity of the image data. If the host processor 110 is not able to authenticate and/or validate the image data, the host processor 110 may halt operation of the system 100 or various components of the system 100. If the host processor 110 is able to authenticate and/or validate the image data, the host processor 110 may utilize the image data to provide operation instructions and/or data to the peripheral systems 115a, 115b.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An integrated circuit capable of communicating with a host processor, comprising:
   a cryptosystem encoded with a password seed, and configured to:
      receive control data from the host processor;
      generate a key based on the password seed;
      authenticate the control data utilizing the key; and
      transmit status data to the host processor, wherein the status data indicates whether the control data from the host processor was authenticated;
   a sensor control circuit coupled to the cryptosystem and configured to:
      receive the authenticated control data from the cryptosystem; and
      generate an operation signal in response to the authenticated control data; and
   a sensor coupled to the sensor control circuit, wherein the sensor is configured to:
      operate according to the operation signal;

generate sensor data; and transmit the sensor data to the cryptosystem.

2. The integrated circuit according to claim 1, wherein the cryptosystem, the sensor control circuit, and the sensor are formed on a single chip.

3. The integrated circuit according to claim 1, wherein the sensor control circuit is further configured to transmit status data to the cryptosystem.

4. The integrated circuit according to claim 1, wherein the cryptosystem comprises:

a password circuit comprising a memory and configured to:

store the password seed; and generate the key; and an authentication circuit coupled to the password circuit and configured to authenticate the control data.

5. The integrated circuit according to claim 1, wherein the cryptosystem comprises a data tagging circuit coupled to an output of the sensor and configured to tag the sensor data with a unique identifier.

6. The integrated circuit according to claim 1, wherein the cryptosystem is further configured to tag the sensor data with a unique identifier and transmit the tagged sensor data to the host processor.

7. The integrated circuit according to claim 1, wherein the cryptosystem generates the key based on at least one of: the control data, the status data, and the sensor data.

8. The integrated circuit according to claim 1, wherein:

the sensor comprises an image sensor; and the sensor data comprises image data.

9. A method for operating a sensor according to control data from a host processor, comprising:

reading the control data from the host processor;

reading a security code transmitted with the control data;

generating a key from a password seed;

decrypting the security code with the key;

determining whether the security code is valid;

transmitting status data to the host processor, wherein the status data indicates whether the security code was valid;

generating an operation signal only if the security code is valid;

halting receipt of subsequent control data if the security code is invalid; and operating the sensor according to the operation signal only if the security code is valid.

10. The method according to claim 9, further comprising:

generating sensor data with the sensor;

tagging the sensor data with a unique identifier; and transmitting the tagged sensor data to the host processor.

11. The method according to claim 10, further comprising validating the unique identifier and operating a peripheral system according to the tagged sensor data.

12. The method according to claim 9, further comprising transmitting status data to the host processor indicating the validity of the security code.

13. The method according to claim 9, wherein generating the key comprises:

generating the key according to a predetermined time interval; and generating the key utilizing an encryption algorithm based on at least one of: the control data, status data, and sensor data.

14. A vehicle system, comprising:

a host processor configured to generate control data according to an operation parameter; and a sensor integrated circuit, coupled to the host processor and configured to transmit status data to the host processor, comprising:

a cryptosystem coupled to the host processor and encoded with a password seed and configured to:

receive the control data from the host processor;

generate a key based on the password seed;

authenticate the control data utilizing the key;

transmit status data to the host processor, wherein the status data indicates whether the control data from the host processor was authenticated; and transmit the authenticated control data; and a sensor control circuit coupled to the cryptosystem and configured to:

receive the authenticated control data from the cryptosystem;

transmit the status data to the cryptosystem; and transmit an operation signal to an image sensor, wherein the image sensor:

generates image data according to the operation signal; and transmits the image data to the cryptosystem.

15. The vehicle system according to claim 14, wherein the cryptosystem, the sensor control circuit, and the sensor are formed on a single chip.

16. The vehicle system according to claim 14, wherein the operation parameter may comprise at least one of: a readout mode, an integration period, and a gain setting.

17. The vehicle system according to claim 14, wherein the cryptosystem comprises:

a password circuit comprising a memory and configured to:

store the password seed; and generate the key; and an authentication circuit coupled to the password circuit and configured to authenticate the control data.

18. The vehicle system according to claim 14, wherein the cryptosystem comprises a data tagging circuit coupled to an output of the image sensor and configured to tag the image data with a unique identifier.

19. The vehicle system according to claim 14, wherein the cryptosystem generates the key based on at least one of: the control data, the status data, and the image data.

20. The vehicle system according to claim 14, wherein:

the cryptosystem is further configured to tag the image data with a unique identifier and transmit the tagged image data to the host processor; and the host processor validates the unique identifier and responds to the tagged image data.

\* \* \* \* \*